3,009,926
3-OXYGENATED 16α-ALKYNYL-
PREGNEN-20-ONES
Walter R. Benn, Deerfield, Ill., assignor to G. D. Searle &
Co., Chicago, Ill., a corporation of Delaware
No Drawing. Filed Oct. 11, 1960, Ser. No. 61,815
5 Claims. (Cl. 260—397.3)

The present invention relates to novel 16α-alkynylated steroids of the pregnane series and especially to 3-oxygenated 16α-alkynylpregnen-20-ones as represented by the structural formulae

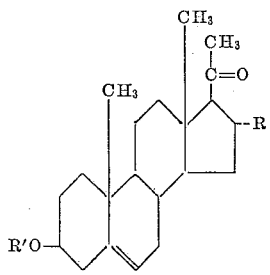

and

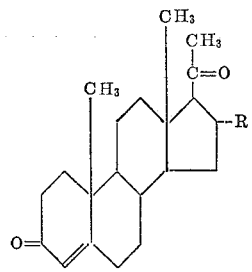

wherein R is a lower alkynyl radical and R' is selected from the group consisting of hydrogen and lower alkanoyl radicals.

Lower alkanoyl radicals encompassed by the R' term are, typically, formyl, acetyl, propionyl, butyryl, valeryl, caproyl, and the branched-chain isomers thereof.

Lower alkynyl radicals represented by R are exemplified by ethynyl, propynyl, butynyl, pentynyl, hexynyl, and the branched-chain isomers thereof.

The compounds of this invention can be prepared by processes utilizing 3β-(lower alkanoyl)oxypregna-5,16-dien-20-ones as starting materials. Reaction of these materials with an alkynyl Grignard reagent, followed by decomposition of the addition product in an acid medium and re-esterification of the 3β-hydroxy group results in the instant 3β-(lower alkanoyl)oxy-16α-(lower alkynyl)-pregn-5-en-20-ones. This addition reaction can be conducted, optionally, in the presence of cuprous salts such as cuprous chloride. Hydrolysis of these 3β-esters, typically with aqueous potassium carbonate in methanol, produces the corresponding 3β-hydroxy compounds, which can be converted to the 16α-alkynylpregn-4-ene-3,20-diones of this invention by oxidation with aluminum isopropoxide and cyclohexanone under the conditions of the Oppenauer reaction. A specific example of these processes is the reaction of 3β-acetoxypregna-5,16-dien-20-one with the ethynyl Grignard reagent followed by decomposition of the adduct, typically with saturated aqueous ammonium chloride, to afford 3β-acetoxy-16α-ethynylpregn-5-en-20-one; hydrolysis of the latter ester with aqueous potassium carbonate in methanol, resulting in 16α-ethynyl-3β-hydroxypregn-5-en-20-one; and oxidation of this alcohol by means of the Oppenauer reaction to afford 16α-ethynylpregn-4-ene-3,20-dione.

The compounds of this invention are useful as a result of their valuable pharmacological properties. In particular, they are anti-hormonal agents in consequence of their ability to inhibit the sodium-retaining activity of desoxycorticosterone acetate.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

Example 1

To a saturated solution of acetylene in 1,332 parts of dry tetrahydrofuran is added 100 parts by volume of a 3 N ethereal methyl magnesium bromide solution, and the reaction mixture is heated at reflux for about 2 hours. A solution of 10 parts of 3β-acetoxypregna-5,16-dien-20-one in 90 parts of dry tetrahydrofuran is added, and refluxing is continued for about 3 hours longer. Acetylene gas is bubbled through the reaction mixture during the entire reflux period. The reaction mixture is cooled, then treated with 45 parts by volume of saturated aqueous ammonium chloride, and the supernatant solution is decanted from the resulting precipitated solid material. This aqueous mixture is extracted with ether and the organic layer is washed with saturated aqueous ammonium chloride, dried over anhydrous sodium sulfate, and concentrated to afford an amber-colored gummy residue.

A mixture of this residue, 20 parts of acetic anhydride, and 100 parts of pyridine is heated on the steam bath for about 30 minutes, then poured into water, and the product is extracted with benzene. The organic layer is dried over anhydrous sodium sulfate and concentrated to dryness in vacuo, and the residue is adsorbed on an alumina chromatographic column.

The chromatographic column is eluted with etherbenzene mixtures containing increasing proportions of ether. The 10–20% ether in benzene eluates are combined and evaporated to dryness, and the resulting residual solid is crystallized from ether-hexane to afford pure 3β-acetoxy-16α-ethynylpregn-5-en-20-one, M.P. 114–115.5°; $[\alpha]_D = -11°$ (chloroform). Infrared maxima are observed at about 3.02, 4.73. 5.75, 5.84, and 7.97 microns.

Example 2

By substituting equivalent quantities of butyne-1,3β-propionoxypregna-5,16-dien-20-one, and propionic anhydride, and otherwise proceeding according to the procedure of Example 1, 16α-(1-butynyl)-3β-propionoxy-pregn-5-en-20-one is obtained.

Example 3

To a solution of 6.3 parts of 3β-acetoxy-16α-ethynyl-pregn-5-en-20-one in 400 parts of methanol is added 5 parts of potassium carbonate and 10 parts of water, and the resulting mixture is heated at reflux, under nitrogen, for about one hour. The reaction mixture is cooled, concentrated to a small volume under nitrogen, then diluted with water. The resulting precipitate is collected by filtration, and the filter cake is washed with water, then dried to afford 16α-ethynyl-3β-hydroxypregn-5-en-20-one, M.P. about 160–165°. Recrystallization from ether-hexane results in a pure sample, M.P. about 163–165.5°; $[\alpha]_D = -10°$ (chloroform).

The substitution of an equivalent quantity of 16α-(1-butynyl)-3β-propionoxypregn-5-en-20-one in the process of this example results in 16α-(1-butynyl)-3β-hydroxy-pregn-5-en-20-one.

Example 4

To a solution of 3.8 parts of 16α-ethynyl-3β-hydroxy-pregn-5-en-20-one and 348 parts of toluene containing 38 parts of cyclohexanone is added 4 parts of aluminum isopropoxide, and this mixture is distilled slowly over a period of about 2 hours, during which time about 120 parts by volume of distillate is collected. The reaction mixture is then treated with about 300 parts by volume of saturated aqueous sodium potassium tartrate, and the organic solvents are removed by steam distillation. This aqueous mixture is extracted with ethyl acetate, and the organic layer is dried over anhydrous sodium sulfate, then concentrated to afford 16α-ethynylpregn-4-ene-3,20-dione. A pure sample of platelet-like crystal, which displays a double melting point at about 130–131.5° and 161–163°, is obtained by recrystallization from acetone-hexane. It is further characterized by an optical rotation of +143.5° in chloroform and an ultraviolet absorption maximum at about 240 millimicrons with a molecular extinction coefficient of about 17,100.

The substitution of an equivalent quantity of 16α-(1-butynyl)-3β-hydroxypregn-5-en-20-one in the process of this example affords 16α-(1-butynyl)pregn-4-ene-3,20-dione.

What is claimed is:
1. A compound of the structural formula

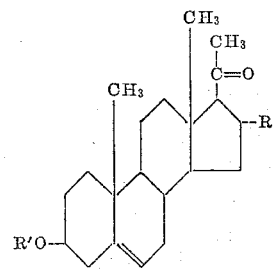

wherein R is a lower 1-alkynyl radical and R' is selected from the group consisting of hydrogen and lower alkanoyl radicals.
2. 3β-acetoxy-16α-ethynylpregn-5-en-20-one.
3. 16α-ethynyl-3β-hydroxypregn-5-en-20-one.
4. A compound of the structural formula

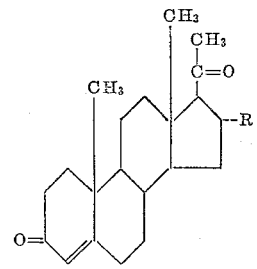

wherein R is a lower 1-alkynyl radical.
5. 16α-ethynylpregn-4-ene-3,20-dione.

References Cited in the file of this patent
UNITED STATES PATENTS 2,280,236     Inhoffen et al. _____ Apr. 21, 1942

OTHER REFERENCES

Sondheimer et al.: J. Org. Chem., vol. 24, pages 1278–80 (September 1959).